(12) United States Patent
Moss et al.

(10) Patent No.: US 9,802,654 B2
(45) Date of Patent: Oct. 31, 2017

(54) METHOD OF ASSEMBLING A VEHICLE UNIFRAME

(71) Applicant: GM Global Technology Operations LLC, Detroit, MI (US)

(72) Inventors: Edward D. Moss, Commerce Township, MI (US); Peter M. Parlow, Columbus, MI (US); Robert N. Saje, Shelby Township, MI (US); Giles D. Bryer, Northville, MI (US); Jonathan J. Andrews, Bowling Green, KY (US)

(73) Assignee: GM Global Technology Operations LLC, Detroit, MI (US)

( * ) Notice: Subject to any disclaimer, the term of this patent is extended or adjusted under 35 U.S.C. 154(b) by 360 days.

(21) Appl. No.: 14/307,640

(22) Filed: Jun. 18, 2014

(65) Prior Publication Data

US 2015/0020388 A1    Jan. 22, 2015

Related U.S. Application Data

(60) Provisional application No. 61/857,124, filed on Jul. 22, 2013.

(51) Int. Cl.
| | |
|---|---|
| *B62D 25/20* | (2006.01) |
| *B62D 27/00* | (2006.01) |
| *B62D 21/02* | (2006.01) |
| *B62D 21/08* | (2006.01) |

(52) U.S. Cl.
CPC ............ *B62D 27/00* (2013.01); *B62D 21/02* (2013.01); *B62D 25/2009* (2013.01); *B62D 25/2018* (2013.01); *B62D 25/2027* (2013.01); *B62D 25/2045* (2013.01); *B62D 21/08* (2013.01); *Y10T 29/49622* (2015.01); *Y10T 29/49895* (2015.01); *Y10T 29/53539* (2015.01)

(58) Field of Classification Search
CPC ............ B62D 25/2045; B62D 25/2009; B62D 25/2018; B62D 25/2027; B62D 27/00; B62D 21/02; B62D 21/05; B62D 21/07; B62D 21/08; B62D 21/10; B62D 21/12; B62D 21/14; Y10T 29/49622; Y10T 29/53539; Y10T 29/49895
USPC ....... 280/785; 29/897.2; 296/193.07, 193.08, 296/193.09, 203.01, 203.02, 203.03, 296/203.04, 204
See application file for complete search history.

(56) References Cited

U.S. PATENT DOCUMENTS

| | | | | |
|---|---|---|---|---|
| 2,901,266 | A | * | 8/1959 | Lindsay ................. B62D 21/02 280/785 |
| 2,935,335 | A | * | 5/1960 | Muller ................... B62D 21/07 280/792 |

(Continued)

FOREIGN PATENT DOCUMENTS

| | | |
|---|---|---|
| CN | 1646359 A | 7/2005 |
| CN | 202294977 U | 7/2012 |

(Continued)

OTHER PUBLICATIONS

Chinese Office Action dated Mar. 28, 2016; Application No. 201410349289.8; Applicant: GM Global Technology Operations LLC.; 6 Pages.

*Primary Examiner* — Jermie Cozart
(74) *Attorney, Agent, or Firm* — BrooksGroup (57) ABSTRACT

One variation may include using a plurality of node structures to assemble a uniframe.

16 Claims, 10 Drawing Sheets

(56) References Cited

U.S. PATENT DOCUMENTS

| | | | |
|---|---|---|---|
| 2,964,331 A * | 12/1960 | Sherman | B62D 21/07 280/790 |
| 3,088,750 A * | 5/1963 | Schilberg | B62D 21/07 280/790 |
| 3,129,954 A * | 4/1964 | Duero | B62D 21/07 280/792 |
| 3,162,478 A * | 12/1964 | Richards | B62D 21/10 280/790 |
| 4,386,792 A * | 6/1983 | Moore | E04C 3/00 280/781 |
| 5,002,333 A * | 3/1991 | Kenmochi | B62D 21/10 296/204 |
| 5,096,010 A * | 3/1992 | Ojala | B60K 13/02 123/184.56 |
| 5,112,102 A * | 5/1992 | Wurl | B62D 23/00 280/785 |
| 5,320,403 A * | 6/1994 | Kazyak | B62D 23/005 296/203.01 |
| 5,322,208 A * | 6/1994 | Hinrichs | B23K 9/025 228/182 |
| 5,561,902 A * | 10/1996 | Jacobs | B21D 5/08 280/785 |
| 5,718,048 A * | 2/1998 | Horton | B21D 5/08 280/785 |
| 5,855,394 A * | 1/1999 | Horton | B21D 5/08 280/781 |
| 6,003,935 A * | 12/1999 | Kalazny | B62D 21/14 280/785 |
| 6,120,059 A * | 9/2000 | Beckman | B62D 21/02 180/312 |
| 6,299,240 B1 * | 10/2001 | Schroeder | B62D 21/02 296/203.01 |
| 6,389,697 B1 * | 5/2002 | Benoit | B21D 26/14 219/617 |
| 6,435,584 B1 * | 8/2002 | Bonnville | B62D 24/00 280/781 |
| 6,533,348 B1 * | 3/2003 | Jaekel | B62D 29/00 296/203.04 |
| 6,540,286 B2 * | 4/2003 | Takemoto | B60N 2/012 296/204 |
| 7,226,121 B2 * | 6/2007 | Dandekar | B62D 25/2018 296/204 |
| 7,322,106 B2 * | 1/2008 | Marando | B22D 19/045 29/507 |
| 7,325,866 B2 * | 2/2008 | Horton | B62D 21/02 280/785 |
| 7,422,272 B2 * | 9/2008 | Horton | B62D 21/02 280/785 |
| 7,614,473 B2 * | 11/2009 | Ono | B60K 1/04 180/291 |
| 7,699,385 B2 * | 4/2010 | Kurata | B62D 25/2036 296/187.08 |
| 7,971,887 B2 * | 7/2011 | Dorr | B62D 21/11 164/111 |
| 8,052,204 B2 * | 11/2011 | Boettcher | B62D 21/02 280/785 |
| 8,177,293 B2 * | 5/2012 | Boettcher | B62D 33/023 29/401.1 |
| 8,210,603 B2 * | 7/2012 | Favaretto | B62D 21/12 280/785 |
| 8,276,980 B2 * | 10/2012 | Boettcher | B62D 25/2018 296/193.07 |
| 8,303,030 B2 * | 11/2012 | Baccouche | B60R 19/24 296/203.01 |
| 8,424,960 B2 * | 4/2013 | Rawlinson | B62D 21/152 296/187.09 |
| 8,567,849 B2 * | 10/2013 | Rawlinson | B62D 21/152 296/187.09 |
| 8,567,855 B2 * | 10/2013 | Gadhiya | B62D 21/152 296/187.09 |
| 8,567,856 B2 * | 10/2013 | Rawlinson | B62D 21/152 296/187.09 |
| 8,585,131 B2 * | 11/2013 | Rawlinson | B62D 25/087 296/187.11 |
| 8,960,776 B2 * | 2/2015 | Boettcher | B62D 33/023 296/193.07 |
| 2002/0050064 A1 * | 5/2002 | Furuse | B62D 23/005 29/897.2 |
| 2002/0162224 A1 * | 11/2002 | Gabbianelli | B21D 26/033 29/897.2 |
| 2004/0119321 A1 * | 6/2004 | Kasuga | F16F 7/12 296/205 |
| 2004/0239091 A1 * | 12/2004 | Horton | B62D 21/02 280/781 |
| 2005/0050730 A1 * | 3/2005 | Marando | B22D 19/045 29/897.2 |
| 2006/0028055 A1 * | 2/2006 | Dandekar | B62D 25/2018 296/204 |
| 2006/0197300 A1 * | 9/2006 | Nakashima | B60G 7/006 280/124.109 |
| 2007/0187994 A1 * | 8/2007 | Yasuhara | B62D 21/06 296/203.04 |
| 2008/0115363 A1 * | 5/2008 | Marando | B22D 19/045 29/897.2 |
| 2008/0265626 A1 * | 10/2008 | Dorr | B62D 21/11 296/204 |
| 2010/0078967 A1 * | 4/2010 | Boettcher | B62D 33/023 296/193.07 |
| 2010/0078968 A1 * | 4/2010 | Boettcher | B62D 33/023 296/193.07 |
| 2011/0163527 A1 * | 7/2011 | Hunt | B62D 21/02 280/785 |
| 2011/0266785 A1 * | 11/2011 | Mildner | B62D 21/11 280/785 |
| 2012/0133177 A1 * | 5/2012 | Baccouche | B60R 19/24 296/187.03 |
| 2012/0169089 A1 * | 7/2012 | Rawlinson | B62D 25/2027 296/193.08 |
| 2012/0175897 A1 * | 7/2012 | Rawlinson | B62D 21/152 293/132 |
| 2012/0175898 A1 * | 7/2012 | Gadhiya | B62D 21/152 293/132 |
| 2012/0175900 A1 * | 7/2012 | Rawlinson | B62D 21/152 293/132 |
| 2012/0175916 A1 * | 7/2012 | Rawlinson | B62D 21/152 296/203.02 |
| 2012/0312612 A1 * | 12/2012 | Harrison, III | B60K 1/04 180/68.5 |
| 2013/0334839 A1 * | 12/2013 | Grevener | B62D 25/2009 296/193.07 |
| 2013/0341969 A1 * | 12/2013 | Fujii | B62D 25/2036 296/193.07 |
| 2014/0300126 A1 * | 10/2014 | Ehrlich | B62D 27/02 296/29 |
| 2015/0001887 A1 * | 1/2015 | Saje | B62D 25/025 296/193.08 |
| 2015/0021892 A1 * | 1/2015 | Moss | B23K 9/032 280/785 |

FOREIGN PATENT DOCUMENTS

| | | | | |
|---|---|---|---|---|
| CN | 202389464 U | | 8/2012 | |
| DE | 102008059152 A1 | * | 5/2010 | B62D 21/02 |
| DE | 202010017552 U1 | * | 6/2012 | B62D 25/20 |
| EP | 1209068 A2 | * | 5/2002 | B62D 25/082 |
| EP | 1439111 A2 | * | 7/2004 | B22D 19/045 |
| EP | 1531114 A1 | * | 5/2005 | B62D 21/02 |
| JP | 01293286 A | * | 11/1989 | B62D 65/02 |
| KR | 1020040033891 A | | 4/2004 | |
| WO | WO 2010030257 A1 | * | 3/2010 | B62D 21/02 |

\* cited by examiner

METHOD OF ASSEMBLING A VEHICLE UNIFRAME

CROSS-REFERENCE TO RELATED APPLICATIONS

This application claims the benefit of U.S. Provisional Application No. 61/857,124 filed Jul. 22, 2013.

TECHNICAL FIELD

The field to which the disclosure generally relates to includes vehicle frame structures and methods of making the same.

BACKGROUND

A vehicle may include a frame structure.

SUMMARY OF ILLUSTRATIVE VARIATIONS

One variation may include a method comprising: assembling a vehicle uniframe comprising: assembling a right and left rail assembly comprising: providing a right side and left side front node structure and a right side and left side rear node structure, each node structure having at least one chassis component attachment point and at least one fixture mounting point; attaching the left and the right front node structures and the left and right rear node structures to an assembly fixture; top loading a right and left center rail segment onto the right and left front and rear node structures respectively; axially inserting a right and left front rail segment into the right and left front node structures respectively; and axially inserting a right and left rear rail segment into the right and left rear node structures respectively.

Another variation may include a product comprising: a rail assembly; wherein the rail assembly comprises a front rail segment, a front node structure, a center rail assembly, a rear node structure, and a rear rail segment.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
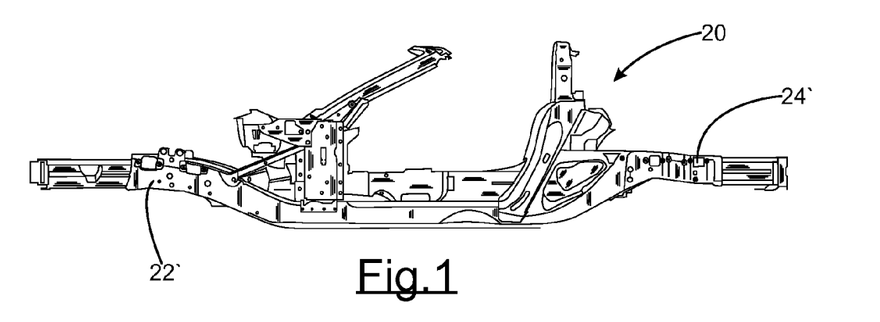
FIG. 1 illustrates a side view of a vehicle uniframe according to a number of variations.
Figure 2:
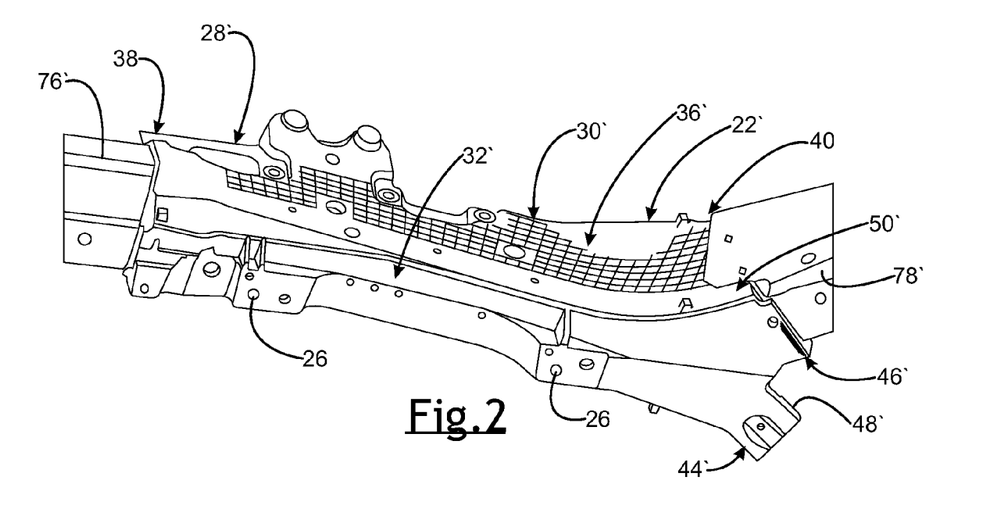
FIG. 2 illustrates a prospective view of a node structure according to a number of variations.
Figure 3:
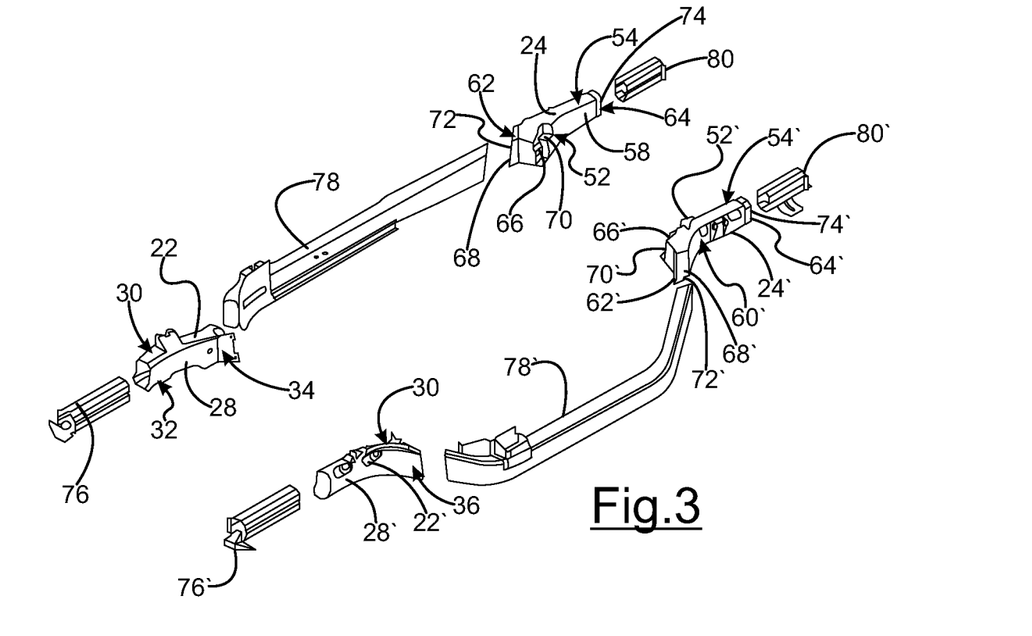
FIG. 3 illustrates an exploded view of a right side and left side rail assembly according to a number of variations.

Referring to FIGS. 1-3, in any of a number of variations, a vehicle may include a unibody or uniframe 20. In any of a number of variations, a uniframe 20 may include a vehicle frame and a vehicle body as one single unit. A uniframe 20 may comprise any of a number of materials including, but not limited to, aluminum or steel.

A uniframe 20 may be assembled in any of a number of variations. In a number of variations, the uniframe 20 may be made from a number of materials including metals such as aluminum and alloys thereof, steel, and composites. In a number of variations, components of the uniframe 20 may be machined prior to assembly. In a number of variations, a number of components may be assembled using an adhesive and/or fasteners such as flow drill screws, thereby reducing the amount of welding for assembly and reducing the distortion of the assembled uniframe 20 compared to the components completely welded together. In a number of variations, no post/assembly machining of the assembled uniframe 20 is necessary to meet design tolerances. In one variation, a vehicle uniframe 20 may be assembled using a plurality of node structures 22, 22', 24, 24' which may be constructed and arranged to include at least one chassis component mounting point or feature (not illustrated) and at least one fixture positioning point or feature 26. The node structures 22, 22', 24, 24' including positional points for vehicle assembly may allow for increased fore and aft tolerances of the chassis components which may allow the uniframe 20 to be assembled within a required tolerance without the need for post assembly machining.

Figure 9:
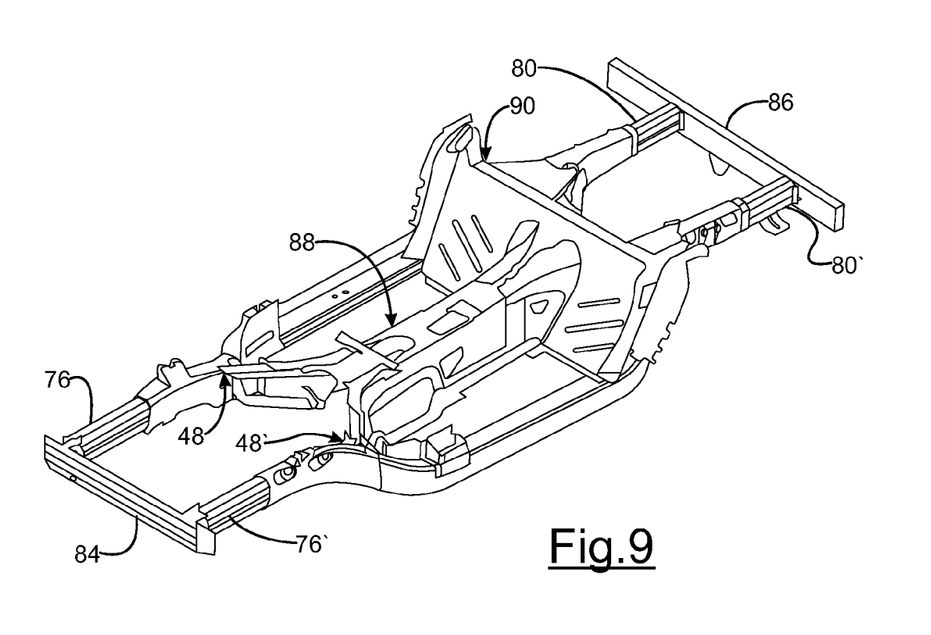
FIG. 9 illustrates a prospective view of a center tunnel assembly, seat back panel assembly, rail assemblies, and front and rear bumpers according to a number of variations.
Figure 13:
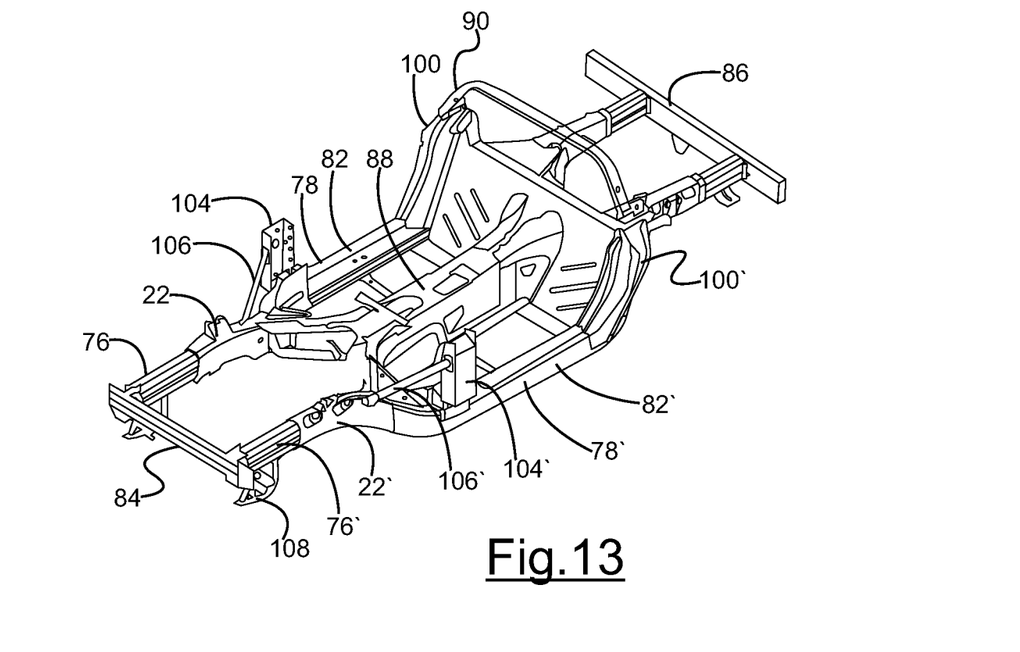
FIG. 13 illustrates a prospective view of a center tunnel assembly, seat back panel assembly, rail assemblies, and front and rear bumpers, support structures, and various vehicle components according to a number of variations.
Figure 18:
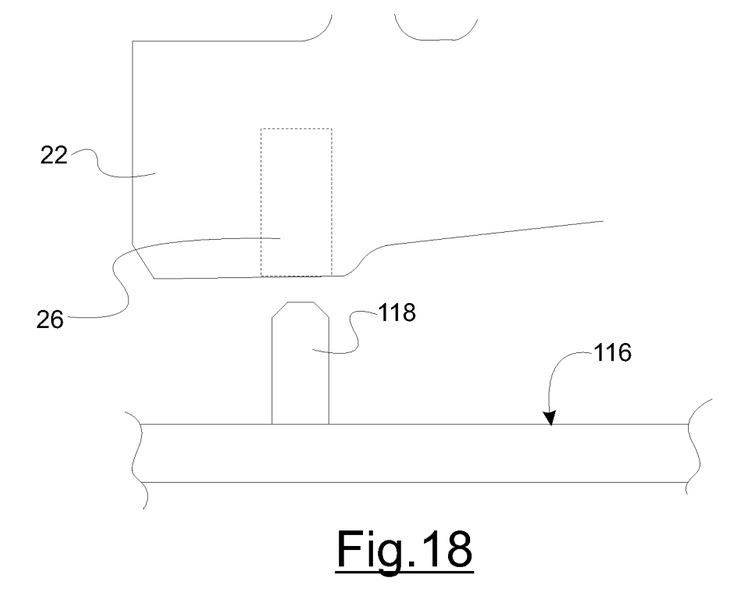
FIG. 18 illustrates a side view of a vehicle assembly fixture and a front node structure according to a number of variations.

Referring to FIGS. 2-6, 9, 13, and 18 in any of a number of variations, a front node structure 22, 22' may comprise a hollow member 28, 28' which may include at least one chassis component mounting point or feature (not illustrated) and at least one fixture positioning point or feature 26. A front nod 22, 22' may include top structure 30, 30' a bottom structure 32, 32', an inboard side structure 34, 34', and an outboard side structure 36, 36'. The bottom structure 32, 32' of the front node 22, 22' may include at least one assembly fixture positioning point or feature 26, 26', for example but not limited to, two openings or holes, which may be constructed and arranged to attach to an assembly fixture 116 via an assembly fixture pin 118, for example as illustrated in FIG. 18. The top structure 30, 30' of the front node 22, 22' may be constructed and arranged to accommodate and/or position at least one front structural panel (not illustrated) and/or a front hinge pillar bracing attachment 106, 106', for example as illustrated in FIG. 13. The front region 38 of the front node 22, 22' may include a socket feature 42 which may be constructed and arrange to accommodate and align a front rail segment 76, 76'. In any of a number of variations, the rear region 40 of the front node 22, 22' may fan out into an inboard portion 44, and an outboard portion 46, for example as illustrated in FIG. 2. The inboard portion 44 may be constructed and arranged to act as a seat feature 48, 48' for a center tunnel assembly 88, for example as illustrated in FIG. 9, which may allow the center tunnel assembly 88 to be installed within a required tolerance. The outboard portion 46 may be constructed and arranged to act as a seat 50, 50' which may be used to accommodate and align a center rail segment 78, for example as illustrated in FIG. 2, which may allow the center rail segment 78, 78' to be installed within a required tolerance. The front node 22, 22' may also include at least one chassis mounting point or feature (not illustrated) which may be used to align and attach at least one chassis component which may include, but is not limited to, the front suspension (not illustrated) and/or a front cradle (not illustrated).

Figure 4:
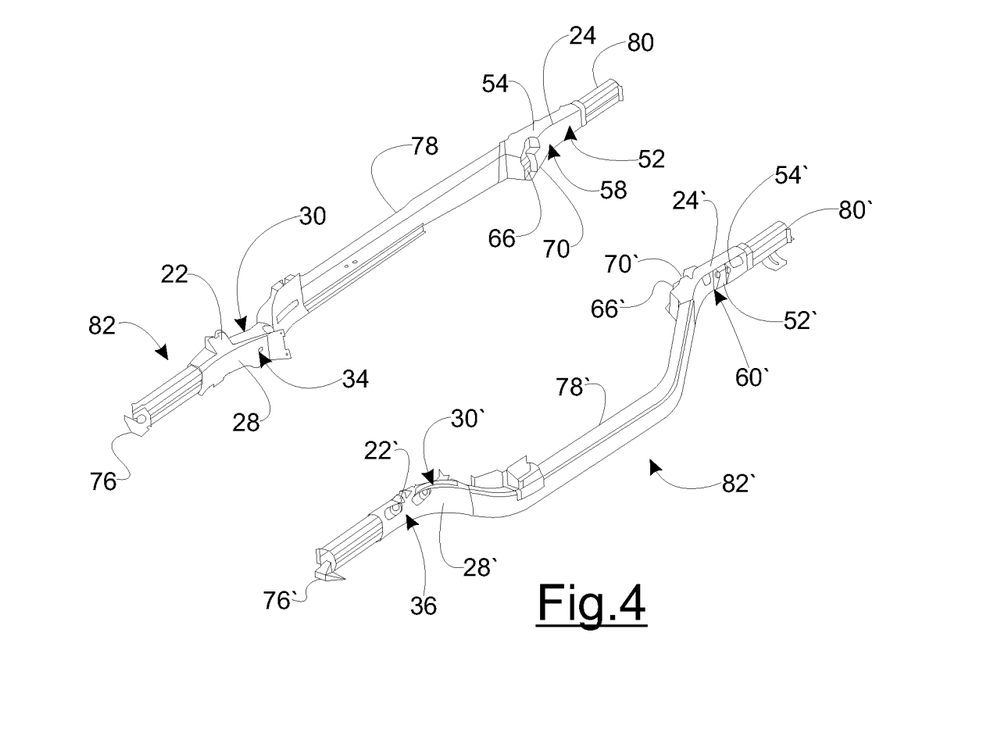
FIG. 4 illustrates a prospective view of a right side and left side rail assembly according to a number of variations.
Figure 5:
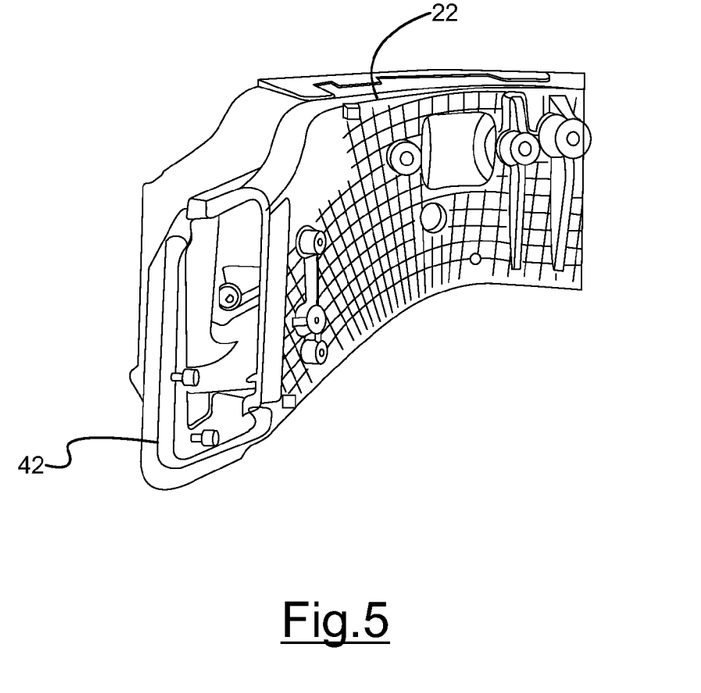
FIG. 5 illustrates a close-up view of a node structure according to a number of variations.
Figure 6:
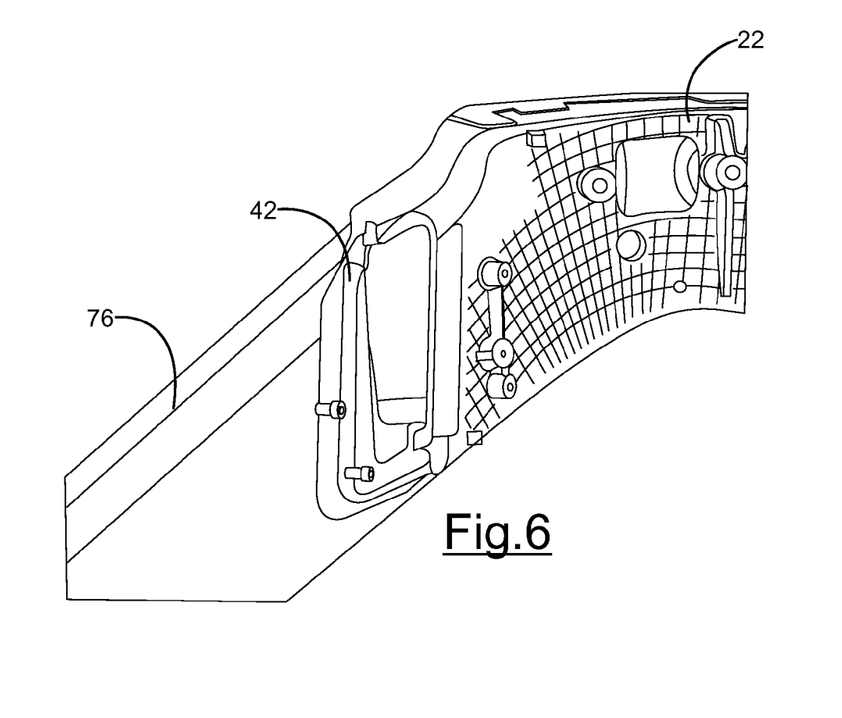
FIG. 6 illustrates a close-up view of a node structure and front rail segment according to a number of variations.
Figure 7:
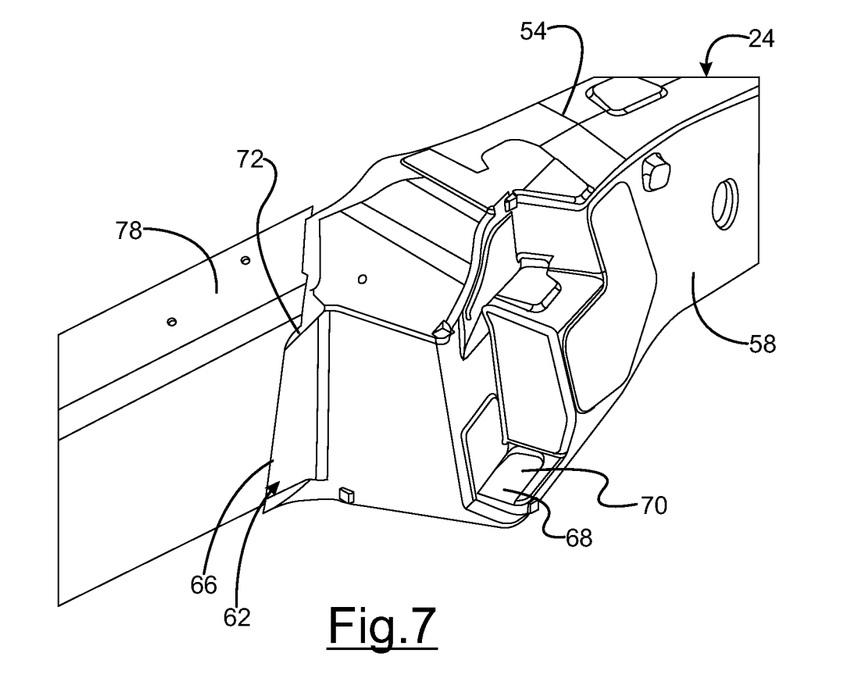
FIG. 7 illustrates a close-up view of a node structure and center rail segment according to a number of variations.
Figure 15:
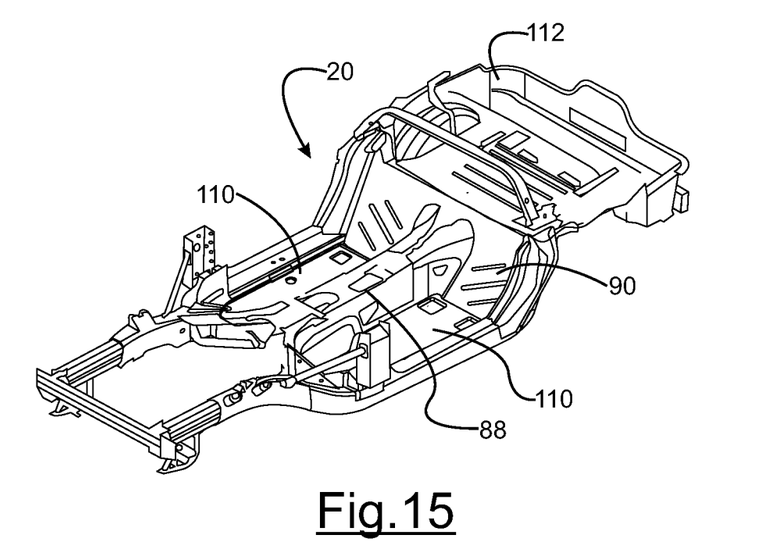
FIG. 15 illustrates a prospective view of a center tunnel assembly, seat back panel assembly, rail assemblies, front and rear bumpers, support structures, various vehicle components, and various panels according to a number of variations.
Figure 19:
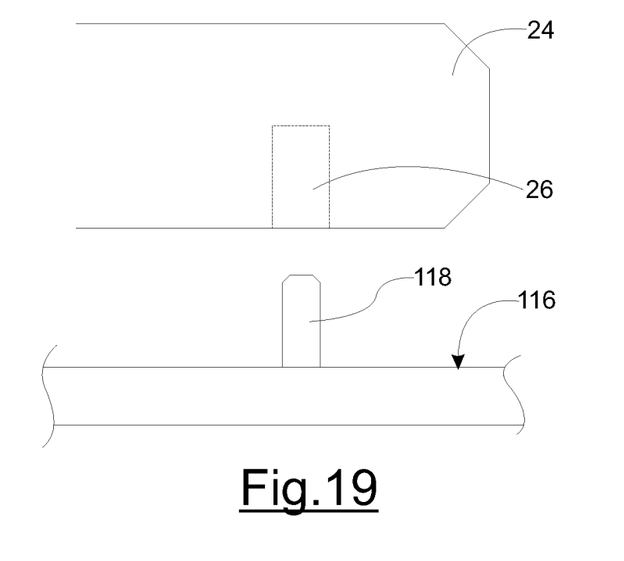
FIG. 19 illustrates a side view of a vehicle assembly fixture and a rear node structure according to a number of variations.

Referring to FIGS. 2-4, 7, 9,15, and 19 in any of a number of variations, a rear node structure 24, 24' may comprise a hollow member 52, 52' which may include at least one chassis mounting point or feature (not illustrated) and at least one fixture positioning point or feature 26. A rear nod 24, 24' may include a top structure 54, 54', a bottom structure 56, 56', an inboard side structure 58, 58', and an outboard side structure 60, 60'. The bottom structure 56, 56' of the rear node 24, 24' may include at least one assembly fixture mounting point or feature 26, for example but not limited to, two openings or holes, which may be constructed and arranged to attach to an assembly fixture 116 via an assembly fixture pin 118, for example as illustrated in FIG. 19. The top structure 54, 54' of the rear node 24, 24' may be constructed and arranged to accommodate and/or position a seat back panel assembly 90 and/or a tub panel assembly 112, for example as illustrated in FIG. 15, which may allow the seat back panel 90 and/or tub panel assembly 112 to be assembled within a required tolerance. The rear region 64, 64' of the rear node 24, 24' may be constructed and arrange to accommodate and align a rear rail segment 80, 80'. In any of a number of variations, the front region 62, 62' of the rear node 24, 24' may fan out into an inboard portion 66, 66' and an outboard portion 68, 68'. The inboard portion 66, 66' may be constructed and arranged to act as a seat feature 70, 70' which may align and accommodate a seat back panel assembly 90, for example as illustrated in FIG. 7, which may allow the seat back panel assembly 90 to be assembled within a required tolerance. The outboard portion 68, 68' may be constructed and arranged to act as a seat 72, 72' which may be used to accommodate and align a center rail segment 78, 78', for example as illustrated in FIG. 4, which may allow for the center rail segments 78, 78' to be assembled within a required tolerance. The rear node 24, 24' may also include at least one chassis component mounting point or feature (not illustrated) which may be used to align and attach at least one chassis component, including, but not limited to, a rear suspension (not illustrated) or a rear cradle (not illustrated). The front and rear node structures 22, 22', 24, 24' may comprise any of a number of materials including, but not limited to, aluminum or steel and may be formed in any of a number of variations including, but not limited to, casting.

Referring to FIGS. 3-4, 6-7, and 18 in any of a number of variations, a vehicle uniframe 20 may be assembled by attaching the fixture position points or features 26 on the bottom structure 32, 32', 56, 56' of the front and rear node structures 22, 22', 24, 24'. In one variation, the fixture positioning point holes 26 may be placed onto an assembly fixture pin 118, for example as illustrated in FIG. 19.

In any of a number of variations, the rail segments 76, 76', 78, 78', 80, 80' may then be attached to the front and rear node structures 22, 22', 24, 24' to form the rail assemblies 82, 82'. In one variation, the center rail segment 78, 78' may be top loaded onto the front node structure 22, 22' inboard seat 50, 50' and the rear node structure 24, 24' seat 72, 72'. The front rail segment 76, 76' may be axially inserted into the front node structure 22, 22' front socket 42, 42' until it bottoms out in the socket 42, 42'. The rear rail segment 80, 80' may be axially inserted into the rear node structure 24, 24' front socket 74, 74' until it bottoms out in the socket 74, 74'. The rail assemblies 82, 82' may comprise any of a number of materials including, but not limited to, aluminum or steel. The front and rear rail segments 76, 76', 80, 80' may be formed in any of a number of variations including, but not limited to, extrusion. The center rail segment 78, 78' may be formed in any of a variety of ways including, but not limited to, hydroforming. The rail assemblies 82, 82' may be secured together in any number of variations including, but not limited to, metal gas arc welding.

In another variation, the rail assemblies 82, 82' may be preassembled to the front and rear node structures 22, 22', 24, 24' before they are attached to the assembly fixture pins.

Figure 8:
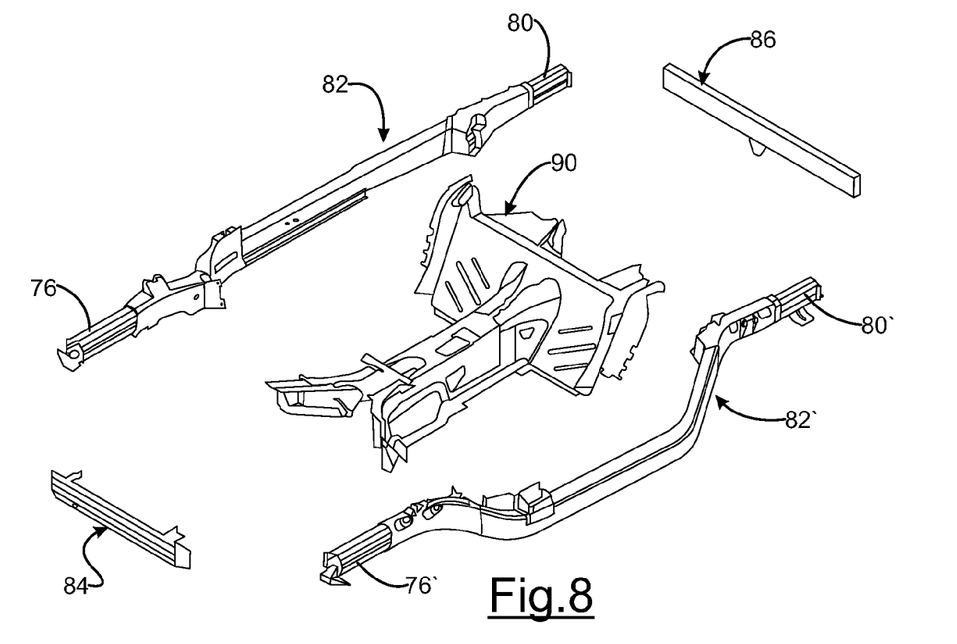
FIG. 8 illustrates an exploded view of a center tunnel assembly, seat back panel assembly, rail assemblies, and front and rear bumpers according to a number of variations.

Referring to FIGS. 8-9, in any of a number of variations, a front and rear bumper assembly 84, 84', 86, 86' may be attached to the rail assemblies 82, 82'. In one variation, the front bumper assembly 84, 84' may be attached to the front rail segments 76, 76" and the rear assembly bumper 86, 86' may be attached to the rear rail segments 80, 80'. The rail assemblies 82, 82' and the front and rear bumper assemblies 84, 84', 86, 86' may form a "box" like frame structure. The front and rear bumper assembles 84, 84', 86, 86' may comprise any of a number of materials including, but not limited to, aluminum or steel and may be formed in any of a number of variations including, but not limited to, extrusion. The front and rear bumpers 84, 84', 86, 86' may be attached to the rail assemblies 82, 82' in any of a number of variations including, but not limited to, metal gas arc welding.

Still referring to FIGS. 8-9, in any of a number of variations, a center tunnel assembly 88 and seat back panel assembly 90 may be attached to the rail assemblies 82, 82'. In any of a number of variations, the center tunnel assembly 88 and seat back panel assembly 90 may top loaded onto the rail assemblies 82, 82' and positioned and aligned into place by the front node structure 22, 22' inboard seat 48, 48' and the rear node structure 24, 24' inboard seat 70, 70'. The center tunnel assembly 88 and seat back panel assembly 90 may comprise any of a number of materials including, but not limited to, aluminum and/or steel. The center tunnel assembly 88 may be attached to the rail assemblies 82, 82' in any of a number of variations including, but not limited to, flow drill screws and adhesive bonding.

Figure 10:
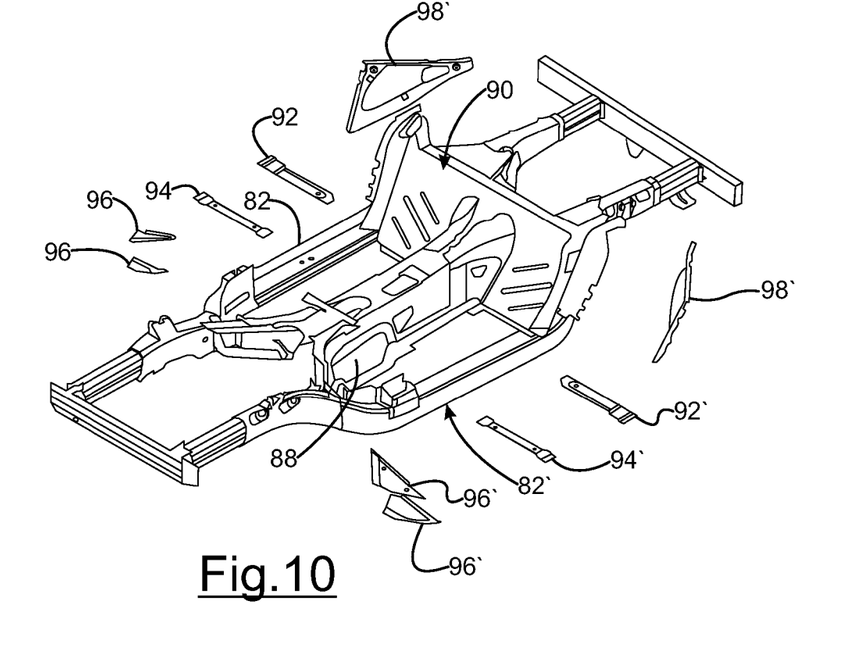
FIG. 10 illustrates a prospective view of a center tunnel assembly, seat back panel assembly, rail assemblies, and front and rear bumpers and an exploded view of support structures according to a number of variations.
Figure 11:
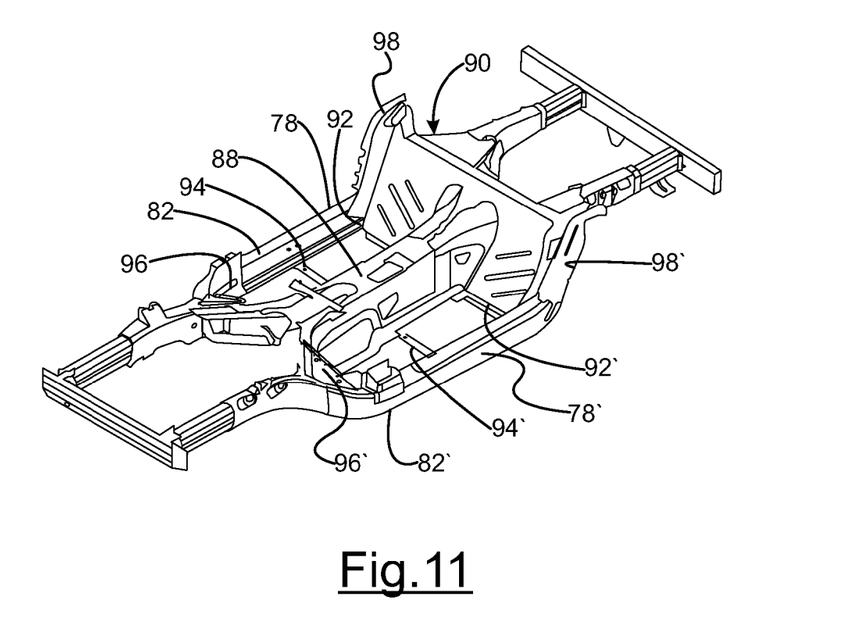
FIG. 11 illustrates a prospective view of a center tunnel assembly, seat back panel assembly, rail assemblies, and front and rear bumpers and support structures according to a number of variations.

Referring to FIGS. 10-11, in any of a number of variations, one or more support structures 92, 92', 94, 94', 96, 96', 98, 98' may be attached to the center tunnel assembly 88, seat back panel assembly 90, and the rail assemblies 82, 82'. In one variation, a right and left side first floor support 92, 92' may be attached to the underside of the rail assemblies 82, 82', the underside of the center tunnel assembly 88, and the underside of the seat back panel assembly 90. A right and left side second floor support 94, 94' may be attached to the underside of the rail assemblies 82, 82' and the underside of the center tunnel assembly 88. A right and left side front splay area support 96, 96' may be attached to the front portions of the center tunnel assembly 88, the front node structures 22, 22', and the center rail segments 78, 78'. A tub support 98, 98' may be attached to the right side and left side rail assemblies 82, 82' and the seat back panel 90 assembly. The support structures 92, 92', 94, 94', 96, 96', 98, 98' may comprise any of a number of materials including, but not limited to, aluminum and/or steel and may be formed in any of a number of variations, including, but not limited to, stamping. The support structures 92, 92', 94, 94', 96, 96', 98, 98' may be attached to the center tunnel assembly 88, the seat back panel assembly 90, and the rail assemblies 82, 82' in any of a number of variations including, but not limited to, flow drill screws and a structural adhesive.

Figure 12:
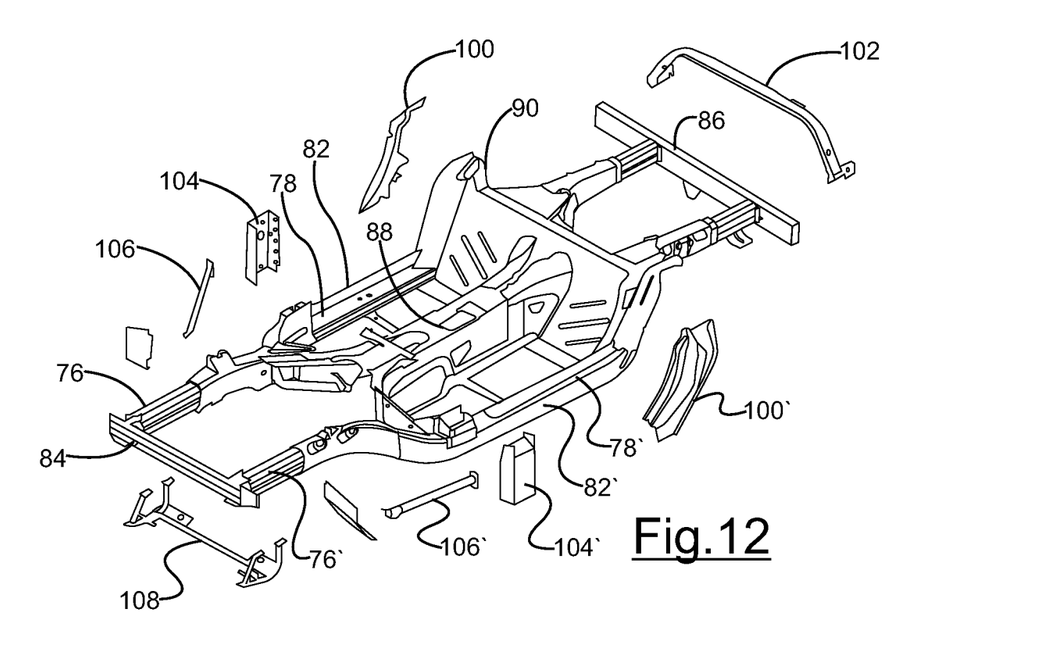
FIG. 12 illustrates a prospective view of a center tunnel assembly, seat back panel assembly, rail assemblies, and front and rear bumpers, support structures, and an exploded view of various vehicle components according to a number of variations.

Referring to FIGS. 12-13, in any of a number of variations, one or more vehicle structures 100, 100', 102,104, 104', 106, 106', 108, may be attached to the center tunnel assembly 88, seat back panel assembly 90, and rail assemblies 82, 82'. The one or more vehicle structures may include a lock pillar outer subassembly 100, 100', roof bow assembly 102, front body hinge pillar 104, 104', front body hinge pillar bracing assembly 106, 106', and a radiator support 108. The lock pillar outer subassembly 100, 100' may be attached to the seat back panel assembly 90 and center rail segments 78, 78'. The roof bow assembly 102 may be attached to the seat back panel assembly 90. The front body hinge pillars 104, 104' may be attached to the center rail segments 78, 78'. The front body hinge pillar bracing attachment 106, 106' may be attached to the front body hinge pillar 104, 104' and the front node structures 22, 22'. The radiator support assembly 108 may be attached to the front bumper assembly 84 and the front rail segments 76, 76'. The vehicle structures 100, 100', 102,104, 104', 106, 106', 108 may comprise any of a number of materials including, but not limited to aluminum and/or steel, and may be attached to the center tunnel assembly 88, seat back panel assembly 90, and rail assemblies 82, 82' in any of a number of variations including, but not limited to, flow drill screws and a structural adhesive.

Figure 14:
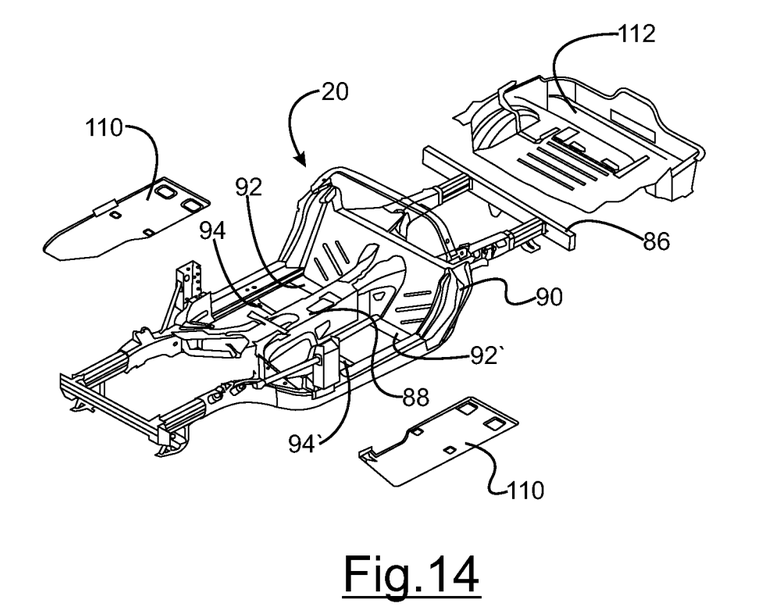
FIG. 14 illustrates a prospective view of a center tunnel assembly, seat back panel assembly, rail assemblies, front and rear bumpers, support structures, various vehicle components, and an exploded view of various panels according to a number of variations.

Referring to FIGS. 14-15, in any of a number of variations, at least one panel 110, 110', 112 may be attached to the uniframe 20. In one variation, a right and left floor panel 110, 110' may be attached to the first and second floor supports 92, 92', 94, 94', the center tunnel assembly 88, and the seat back panel assembly 90. A tub panel 112 may be attached to the seat back panel assembly 90, the rear node structures 24, 24', the rear rail segments 80, 80', and the rear bumper assembly 86. The panels 110, 110', 112 may comprise any of a number of materials including, but not limited to aluminum or steel and may be attached to the uniframe 20 in any of a number of variations including, but not limited to, an adhesive bond.

Figure 16:
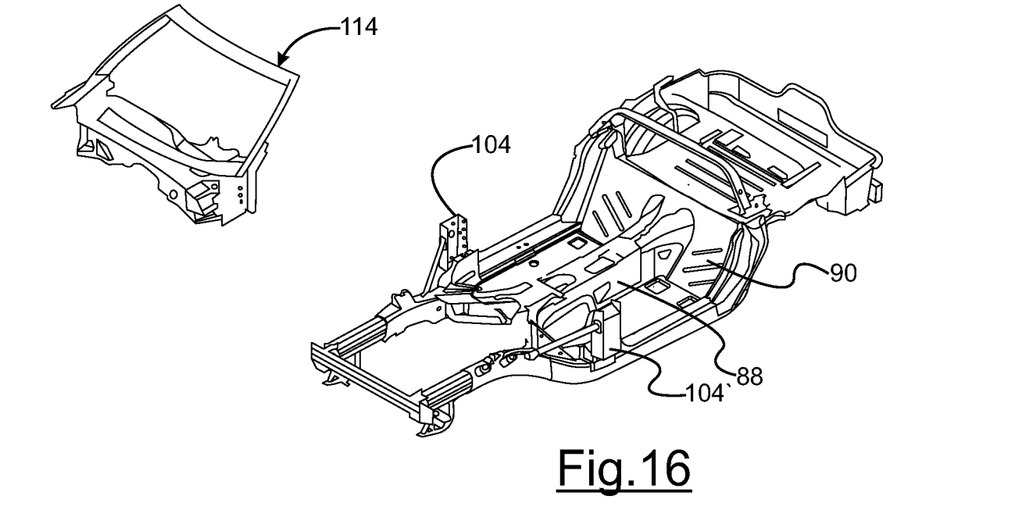
FIG. 16 illustrates a prospective view of a center tunnel assembly, seat back panel assembly, rail assemblies, front and rear bumpers, support structures, various vehicle components, various panels, and a cockpit according to a number of variations.
Figure 17:
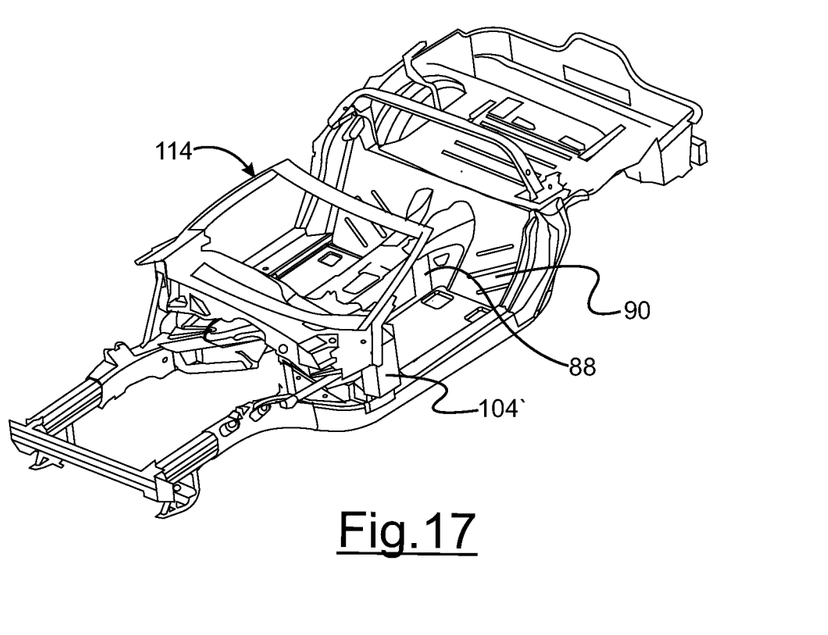
FIG. 17 illustrates a prospective view of a center tunnel assembly, seat back panel assembly, rail assemblies, front and rear bumpers, support structures, various vehicle components, various panels, and a cockpit according to a number of variations.

Referring to FIGS. 16-17, in any of a number of variations, a cockpit frame assembly 114 may be attached to the front body hinge pillars 104, 104', the center tunnel assembly 88, and the rail assemblies 82, 82'. The cockpit frame assembly 114 may comprise any of a number of materials including, but not limited to, aluminum and/or steel and may be attached to the center tunnel assembly 88, seat back panel assembly 90, and rail assembly 82, 82' with the use of a structural adhesive and a plurality of bolts.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: assembling a vehicle uniframe comprising: providing a right and left rail assembly comprising: providing a right side and left side front node structure and a right side and left side rear node structure having at least one chassis component attachment point and at least one fixture mounting point; attaching the left and the right front node structures and the left and right rear node structures to an assembly fixture; top loading a right and left center rail segment onto the right and left front and rear node structures respectively; axially inserting a right and left front rail segment into the right and left front node structures respectively; and axially inserting a right and left rear rail segment into the right and left rear node structures respectively.

Variation 2 may include a method as set forth in Variation 1 further comprising attaching a front bumper to the front rail segments and attaching a rear bumper assembly to the rear rail segments.

Variation 3 may include a method as set forth in any of Variations 1-2 further comprising top loading a center tunnel assembly and seat back panel assembly onto the rail assemblies based on an assembly feature on the front and rear node structures respectively.

Variation 4 may include a method as set forth in any of Variations 1-3 further comprising attaching a plurality of support structures to the rail assemblies, center tunnel assemblies, and the seat back panel assemblies.

Variation 5 may include a method as set forth in any of Variations 1-4 wherein the plurality of support structures include a first floor support, a second floor support, a right and left splay support, and a tub support.

Variation 6 may include a method as set forth in any of Variations 1-5 further comprising attaching a lock pillar outer subassembly to the seat back panel assembly and the center rail segments.

Variation 7 may include a method as set forth in any of Variations 1-6 further comprising attaching a roof bow to the lock pillar outer subassembly.

Variation 8 may include a method as set forth in any of Variations 1-7 further comprising attaching a roof bow to the seat back panel assembly.

Variation 9 may include a method as set forth in any of Variations 1-8 further comprising attaching a left and right front body hinge pillar to the center rail segment.

Variation 10 may include a method as set forth in any of Variations 1-9 further comprising attaching a right and left front body hinge pillar bracing attachment to the front node structures respectively and the left and right front body hinge pillars respectively.

Variation 11 may include a method as set forth in any of Variations 1-10 further comprising attaching a radiator support to the front bumper assembly and the front rail segments.

Variation 12 may include a method as set forth in any of Variations 1-11 further comprising attaching a right and left floor panel to one or more of the plurality of support structures.

Variation 13 may include a method as set forth in any of Variations 1-12 further comprising attaching a cockpit frame assembly to the front body hinge pillars, the center tunnel assembly, and the rail assemblies.

Variation 14 may include a method comprising: assembling a rail assembly comprising: providing a right side and left side front node structure and a right side and left side rear node structure having at least one chassis component attachment point and at least one fixture mounting point; top loading a right and left center rail segment onto the right and left front and rear node structures respectively; axially inserting a right and left front rail segment into the right and left front node structures respectively; and axially inserting a right and left rear rail segment into the right and left rear node structures respectively.

Variation 15 may include a method as set forth in Variation 14 wherein the front rail segments, front node structures, the center rail segments, the rear node structures, and the rear rail segments are attached via welding.

Variation 16 may include a method comprising: assembling a vehicle uniframe comprising: machining at least one node structure to include a plurality of assembly critical points and building a uniframe within a required tolerance based on the plurality of assembly critical points.

Variation 17 may include a product comprising: a rail assembly; wherein the rail assembly comprises a front rail segment, a front node structure, a center rail assembly, a rear node structure, and a rear rail segment.

Variation 18 may include a product as set forth in Variation 17 wherein the front and rear node structures are constructed and arranged to include a plurality of fixture mounting points and chassis component mounting points.

Variation 19 may include a product as set forth in any of Variations 17-18 wherein a left rail assembly and a right rail assembly are attached to an assembly fixture.

Variation 20 may include a product as set forth in any of Variations 17-19 wherein a front and rear bumper, a center tunnel assembly, and a seat back panel assembly are attached to the right and left rail assemblies.

The above description of select variations within the scope of the invention is merely illustrative in nature and, thus, variations or variants thereof are not to be regarded as a departure from the spirit and scope of the invention.

What is claimed is:

1. A method comprising:
   assembling a vehicle uniframe comprising:
   providing a right rail assembly and a left rail assembly comprising:
   providing a right side front node structure and a left side front node structure and a right side rear node structure and a left side rear node structure having at least one chassis component attachment point and at least one fixture mounting point;
   attaching the left side and the right side front node structures and the left side and the right side rear node structures to an assembly fixture;
   top loading a first end of a right center rail segment onto the right side front node structure and a second end of the right center rail segment onto the right side rear node structure;
   top loading a first end of a left center rail segment onto the left side front node structure and a second end of the left center rail segment onto the left side rear node structure;
   axially inserting a right front rail segment into the right side front node structure;
   axially inserting a left front rail segment into the left front side node structure;
   axially inserting a right rear rail segment into the right side rear node structure;
   and axially inserting a left rear rail segment into the left side rear node structure.

2. The method of claim 1 further comprising attaching a front bumper to the front rail segments and attaching a rear bumper assembly to the rear rail segments.

3. The method of claim 2 further comprising top loading a center tunnel assembly and seat back panel assembly onto the rail assemblies based on an assembly feature on the front side and the rear side node structures respectively.

4. The method of claim 3 further comprising attaching a plurality of support structures to the rail assemblies, center tunnel assemblies, and the seat back panel assemblies.

5. The method of claim 4 wherein the plurality of support structures include a first floor support, a second floor support, a right splay support and a left splay support, and a tub support.

6. The method of claim 4 further comprising attaching a lock pillar outer subassembly to the seat back panel assembly and the center rail segments.

7. The method of claim 6 further comprising attaching a roof bow to the lock pillar outer subassembly.

8. The method of claim 7 further comprising attaching a roof bow to the seat back panel assembly.

9. The method of claim 8 further comprising attaching a left front body hinge pillar to the left center rail segment and a right front body hinge pillar to the right center rail segment.

10. The method of claim 9 further comprising attaching a right front body hinge pillar and a left front body hinge pillar bracing attachment to the front node structures respectively and the left and the right front body hinge pillars respectively.

11. The method of claim 10 further comprising attaching a radiator support to the front bumper assembly and the front rail segments.

12. The method of claim 11 further comprising attaching a right floor panel and a left floor panel to one or more of the plurality of support structures.

13. The method of claim 12 further comprising attaching a cockpit frame assembly to the front body hinge pillars, the center tunnel assembly, and the rail assemblies.

14. A method comprising:
assembling a rail assembly comprising:
providing a right side front node structure and a left side front node structure and a right side rear node structure and a left side rear node structure having at least one chassis component attachment point and at least one fixture mounting point;
top loading a first end of a right center rail segment onto the right side front node structure and a second end of the right center rail segment onto the right side rear node structure;
top loading a first end of a left center rail segment onto the left side front node structure and a second end of the left center rail segment onto the left side rear node structure;
axially inserting a right front rail segment into the right side front node structure and a left front rail segment into the left side front node structure; and
axially inserting a right rear rail segment into the right side rear node structure and a left rear rail segment into the left side rear node structure.

15. The method of claim 14 wherein the front rail segments, front node structures, the center rail segments, the rear node structures, and the rear rail segments are attached via welding.

16. A method comprising:
assembling a vehicle uniframe comprising:
providing a first hollow node structure having a first socket at a first end and a first seat at a second end, a second hollow node structure having a second socket at a first end and a second seat at a second end, a third hollow node structure having a third socket at a first end and a third seat at a second end, and a fourth hollow node structure having a fourth socket at a first end and a fourth seat at a second end, wherein the first, the second, the third, and the fourth node structures each include at least one fixture mounting point;
attaching the first node structure, the second node structure, the third node structure, and the fourth node structure to an assembly fixture;
axially inserting a first front rail assembly into the first socket and axially inserting a second front rail assembly into the second socket;
axially inserting a first rear rail assembly into the third socket and axially inserting a second rear rail assembly into the fourth socket; and
top loading a first center rail segment onto the first seat and the third seat and top loading a second center rail segment onto the second seat and the fourth seat.

* * * * *